UNITED STATES PATENT OFFICE.

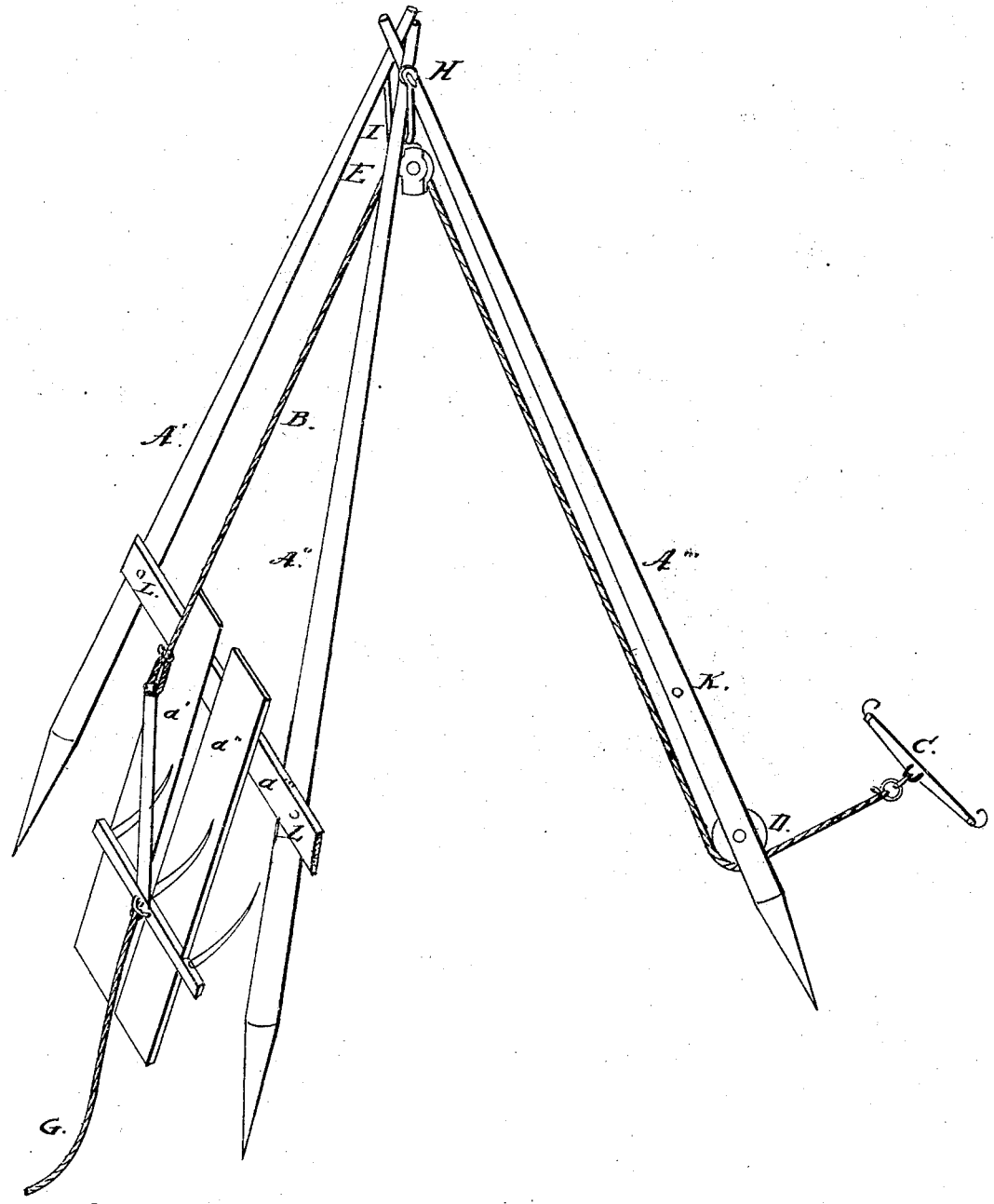

JAS. C. McGREW, OF SMITHFIELD, OHIO.

IMPROVEMENT IN MACHINES FOR ELEVATING HAY.

Specification forming part of Letters Patent No. 22,372, dated December 21, 1858.

*To all whom it may concern:*

Be it known that I, JAMES C. McGREW, of Smithfield, in the county of Jefferson and State of Ohio, have invented a new and useful Machine for Elevating Hay, Grain, Fodder, &c.; and I do hereby declare that the same is described and represented in the following specification and drawing.

To enable others skilled in the art to make and use my invention, I will proceed to describe its construction and operation, referring to the drawing, which is a perspective view of my machine.

The nature of my invention consists in arranging a platform on the shears by which the hay or fodder is hoisted for the hay and fodder to slide upon as it is elevated to the top of the stack or rick being built or formed, as will be hereinafter described.

In the accompanying drawing, A' A'' A''' are poles pointed at their lower ends, so as to enter the ground readily and stand firm, and perforated near their upper ends for the pin $x$, which passes through them, and through the clevis I to connect them firmly together, forming what are technically termed "shears," which may be placed over the place where the stack or rick of hay or fodder is to be built, with their lower ends forced into the ground far enough to make the shears stand firmly. The tackle-block E hangs on the clevis I, and the sheaf D turns on a pin in the pole A''' at a proper height for a horse hitched to the single-tree C to draw the rope B, which runs under the sheaf D, through the block E, and is fastened to the hoisting-fork F, which fork is made in the form shown in the drawing—that is, the tines stand at an angle of about sixty degrees from the handle or part to which the rope B is fastened. The poles which form the shears may have one or a series of holes in them, like the one shown at K for the pins L, which support the bar $a'''$, as shown in the drawing. To this bar the planks $a'$ $a''$ are fastened, their lower ends resting on the ground to form an inclined platform or ways for the hay or fodder to slide, or be drawn upon or against as it is hoisted to the top of the stack or rick being built under the shears, and to prevent it from coming in contact with the side of the rick or stack.

The rope G is fastened to the rear of the fork to aid in releasing from the hay hoisted and to pull the fork down for a new supply. In using this invention the shears are raised over the place selected and the platform applied, and the hay brought opposite the platform by a wagon or otherwise, and the fork inserted under a convenient portion of it, and a horse or other power being applied to the rope B, it is hoisted and deposited between the shears, which serve as guides in building the stack or rick. In this way five times the amount of work can be performed in a given time by the same persons with the aid of a horse or team used to draw the hay to the shears.

What I claim in the above-described machine for elevating hay, grain, fodder, &c., is—

The arrangement of the bar $a'''$ and inclined platform $a'$ $a''$ with the shears and hoisting-fork, all substantially as described, for the purposes set forth.

JAMES C. McGREW.

Witnesses:
JOHN WHITE,
WM. S. BATES.